United States Patent [19]

Schultz

[11] 4,126,236
[45] Nov. 21, 1978

[54] BACKSTACKING APPARATUS

[76] Inventor: Edward D. Schultz, 2306 Cherry Ridge La., Brandon, Fla. 33511

[21] Appl. No.: 788,140

[22] Filed: Apr. 18, 1977

Related U.S. Application Data

[63] Continuation-in-part of Ser. No. 588,423, Jun. 19, 1975, Pat. No. 4,018,323.

[51] Int. Cl.² .............................................. B65G 65/28
[52] U.S. Cl. ................................... 214/10; 37/192 A; 198/508; 198/519
[58] Field of Search ........................... 214/9, 10, 16 R; 37/191 R, 192 R; 198/508, 506, 516, 507, 509, 510, 511, 515, 519

[56] References Cited

U.S. PATENT DOCUMENTS

| 3,297,141 | 1/1967 | Janitsch et al. | 198/519 X |
| 3,487,910 | 1/1970 | Strocher et al. | 198/508 |
| 3,586,152 | 6/1971 | Austin et al. | 214/10 X |
| 3,618,744 | 11/1971 | Hulette | 198/508 |
| 3,625,339 | 12/1971 | Smith | 214/10 X |
| 3,804,229 | 4/1974 | Baldwin, Jr. | 214/10 X |

FOREIGN PATENT DOCUMENTS

| 765,900 | 2/1954 | Fed. Rep. of Germany | 214/10 |
| 1,492,048 | 7/1967 | France | 214/10 |
| 1,042,695 | 9/1966 | United Kingdom | 214/10 |

Primary Examiner—Frank E. Werner
Attorney, Agent, or Firm—Arthur W. Fisher, III

[57] ABSTRACT

A backstacking apparatus for stacking and reclaiming bulk particulate material comprising a particulate handling and movable positioning structure. The particulate handling structure includes a boom comprising a first and second boom member having a rake and rake drive operatively mounted thereon. The movable positioning structure includes a base supported on a pair of substantially parallel rails by rollers disposed on opposite sides thereof to control the horizontal movement of the particulate handling structure relative to the supporting surface and boom hoist coupled between the base and the boom to control the vertical movement of the particulate handling structure relative to the supporting surface.

4 Claims, 2 Drawing Figures

BACKSTACKING APPARATUS

This is a continuation-in-part application of U.S. Pat. No. 4,018,323 issued Apr. 19, 1977.

BACKGROUND OF THE INVENTION

1. Field of the Invention

A backstacking apparatus for stacking and reclaiming bulk particulate material comprising a particulate handling means and movable positioning means.

2. Description of the Prior Art

A large number of devices of various construction for stacking and reclaiming bulk material in piles is well known. Often such devices include separate loading or stacking apparatus and reclaiming or scrapping structures. One such device includes scrappers mounted on a traveling frame such as a gantry. The scrappers are titable thus permitting both vertical and horizontal adjustment relative to the stacking or storage zone. This structure may include a vertical center post usually arranged in the center of the storage zone with the removal scrapper pivotally mounted on the base or center post for reclaiming. The removal or reclaiming operation permits the scrapper boom to be lowered onto the slope of the pile scrapping the bulk material from the slop downward carrying it to a funnel-shaped opening in the support surface in the center of the pile. The disadvantage of such devices is readily apparent since the effective storage volume is relatively small in proportion to the required floor area in the enclosed space for the pile.

Recent examples of particulate handling apparatus include combination stacking and reclaiming structure in an integrated, unitary system. Such devices commonly feature a conveyor feed means for carrying the particulate material to the storage zone and a rake-like reclaiming structure operatively coupled to a boom for reclaiming the stored particulate material. As with the previously described structure, the storage capacity is relatively smaller in proportion to the required floor area due to the buildup of the storage particulate material away from the base of the boom. In addition, the initial cost of the conveyor feed means along with the operational expense and replacement cost are substantial.

Thus, it is obvious that a combined reclaiming apparatus without the necessity of the conveyor feed means would greatly enhance the operational reliability and reduce the initial cost and operational expense of such particulate handling apparatus. In addition, a device increasing greatly the storage volume in proportion to the floor space would greatly reduce the cost of such particulate handling.

SUMMARY OF THE INVENTION

The present invention relates to a backstacking apparatus for stacking and reclaiming bulk particulate material. More specifically the backstacking apparatus comprises a particulate handling means mounted on a movable positioning means.

The particulate handling means includes a boom means comprising a first and second boom member having a rake means and rake drive means operatively mounted thereon. The second boom member is fixedly attached to the movable positioning means while the inner end of the first boom member is pivotally attached to the movable positioning means to permit vertical adjustment of the boom means relative to the supporting surface as more fully described hereinafter. The rake means includes a pair of endless chain means operatively mounted on the boom means in substantially parallel spaced relation by the rake drive means and at least one rake blade extending between corresponding points of the endless chain means. The rake drive means includes at least two pair of chain sprockets rotatably mounted in fixed spaced relation on said boom means. The chain sprockets are disposed to engage the endless chain means. At least one pair of sprockets are attached to a drive means operable in either a forward or reverse mode to stack or reclaim particulate material as more fully described hereinafter. The rake drive means may further include one or more pair of hold down chain sprockets disposed to engage the endless chain means and retain same on the boom means.

The movable positioning means includes a base supported on a pair of substantially parallel rails by roller means disposed on opposite sides thereof to control the horizontal movement of the particulate handling means relative to the supporting surface and boom hoist means coupled between the base and the boom means to control the vertical movement of the particulate handling means relative to the supporting surface. A feed hopper having a two-position control gate attached thereon extends upwardly from the base to selectively control the flow of particulate material to the storage zone or loading zone as more fully described hereinafter. The base comprises a substantially horizontal platform having a two-position loading gate in open communication with the feed hopper formed thereon. The boom hoist means comprises a first and second boom hoist member, attached to the platform at the lower ends thereof and interconnected to each other at the upper ends thereof, a boom hoist drive means mounted on the platform and a hoist cable interconnected between the boom hoist drive means and the boom means to adjust the vertical position thereof relative to the supporting surface.

In operation, a particulate material is fed to the feed hopper where it is distributed to the storage zone when the control gate is in the first position and to the loading zone when the control gate is in the second position. The position of loading gate is coordinated with the control gate to feed particulate material to the storage zone when both gates are in the first position and to the loading zone when both gates are in the second position.

When storing or stacking, particulate material is fed from the feed hopper to the storage zone where the rake means driven in the forward or stacking direction engages the upper surface of the particulate material to draw the material outwardly relative to the base. As the material builds up relative to the supporting surface the base is moved horizontally on the rails to build up the pile evenly parallel to the rails. As the pile builds upwardly from the supporting surface, the boom means is adjusted upwardly by the boom hoist means to permit the pile to build upwardly.

To withdraw or reclaim, the loading gate is placed in the second position with the rake means driven in the second or reclaiming direction. As previously described horizontal and vertical position of the boom means is adjusted to keep the rake means in contact with the upper surface of the stacked particulate material. As the particulate material is drawn inwardly to the base, the particulate material is drawn onto the platform and loading zone by the rake means where it is fed through the loading gate to a conveyor or other suitable transport means for conveyance to a remote site.

With both the control gate and loading gate in the second position, particulate material may be fed directly from the feed hopper to the load zone for transport to a remote site.

It is thus apparent that this combination of elements provides an effective and efficient backstacking apparatus.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
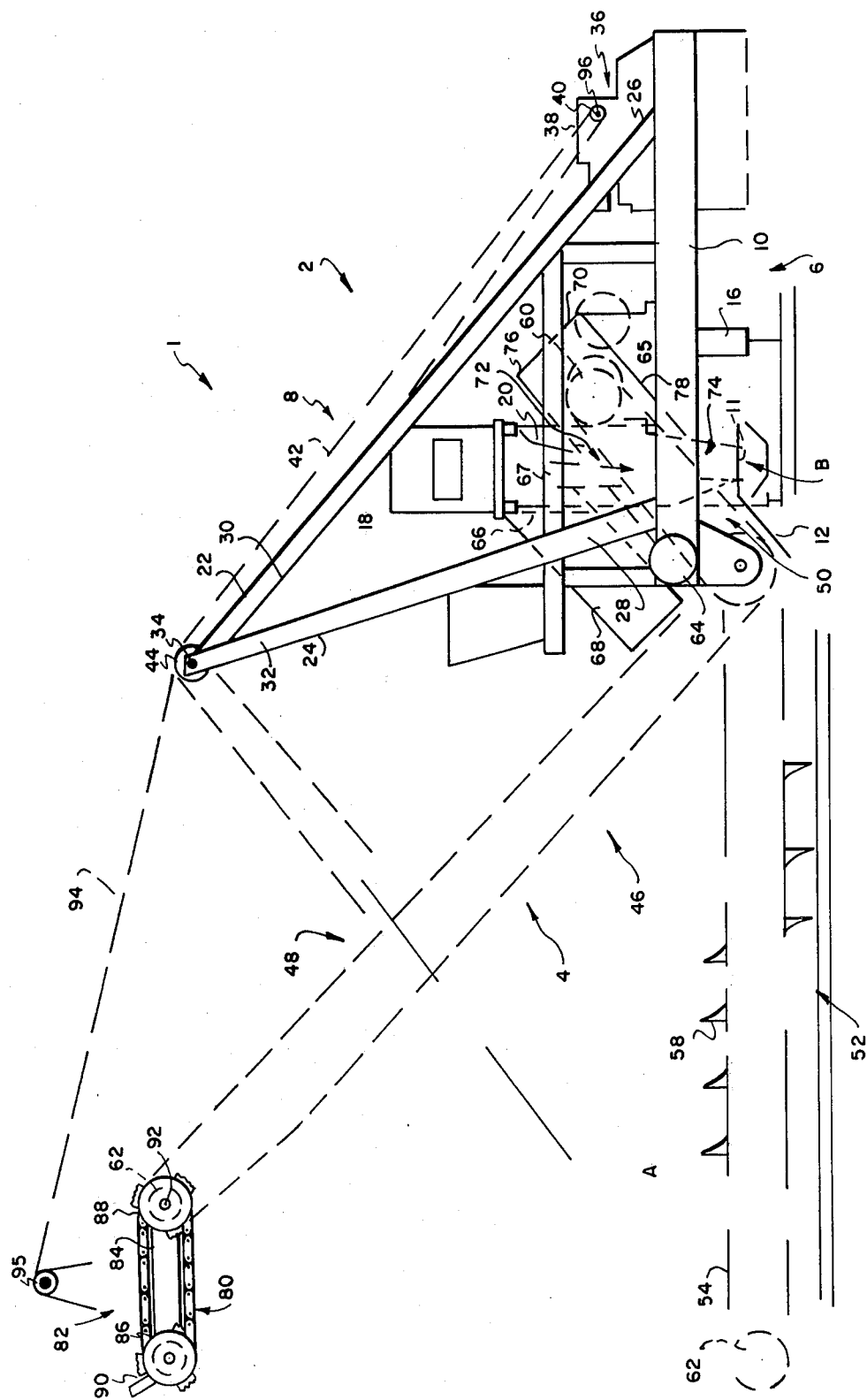
FIG. 1 is a side view of a backstacking apparatus.

As best shown in FIG. 1 the backstacking apparatus generally indicated as 1 comprises a movable positioning means generally indicated as 2 and a particulate handling means generally indicated as 4 mounted thereon. The movable positioning means 2 comprises a base generally indicated as 6 having boom hoist means generally indicated as 8 operatively mounted thereon. The base 6 includes a substantially horizontal platform 10 having inclined loading plate 12. The platform 10 is movably mounted on rails (not shown) disposed at opposite sides thereof by means of roller 16 operatively coupled to the lower portion of the platform 10. The loading plate 12 also includes a loading gate 11 having a first and second position in communication with a feed hopper 18 formed thereon. The feed hopper 18 is attached to the upper portion of the platform 10. The feed hopper 18 includes control gate comprising element 20 movable between a first and second position to selectively control the flow of particulate material to the storage or stacking zone A when in the first position and the loading zone B when in the second position as more fully described hereinafter. Boom hoist means 8 comprises first and second boom hoist members 22 and 24 respectively attached at their respective lower ends 26 and 28 to the upper portion of the platform 10 and interconnected to each other at their upper portions 30 and 32 respectively at 34. Boom hoist means 8 further includes a boom hoist drive 36 including boom hoist drive means 38 and power cable reel 40. Operatively coupled to the power cable reel 40 is cable 42 extending the length of first boom hoist member 22 over roller 44 to the particulate handling means 4 to adjust the vertical position thereof relative to the supporting surface.

The particulate handling means 4 includes a boom means generally indicated as 46 comprising a first and second boom member 48 and 50 respectively having a rake means generally indicated as 52 and a rake drive means operatively mounted thereon. The second boom member 50 is fixedly attached to the upper surface of base 6 while the inner end of the first boom member 48 is pivotally attached to the base 6 to permit vertical adjustment of the boom means 46 relative to the supporting surface and more fully described hereinafter. The rake means 52 includes a pair of endless chain means 54 operatively mounted on the boom means 46 and substantially parallel spaced relation relative to each other by the rake drive means and at least one rake blade 58 extending between the corresponding points of the endless chain means. The rake drive means includes at least two pair of chain sprockets 60 and 62 mounted in fixed spaced relation on boom means 46. The chain sprockets 60 and 62 are disposed to engage the endless chain means. At least one pair of the chain sprockets 60 is attached to a drive means 65 which is operable in either the forward or stacking mode or reverse or loading mode to stack or reclaim particulate material as more fully described hereinafter. The rake drive means may further include one or more pair of hold down chain sprockets 64 disposed to engage the endless means to retain dsame on the boom means 6. As can be seen, the first boom member 48 may comprises a plurality of boom sections coupled together by fastening means to permit construction of various sizes.

As previously described the control gate 20 is hingedly attached to hopper 18. The control gate 20 is movable between a first or closed position and a second or open position. First and second feed apertures 66 and 67 are formed in the side of hopper 18. Immediately adjacent the feed aperture 66 is a feed chute 68 extending outwardly from the side of hopper 18. A unitized dust cover or enclosure 70 is arranged in surrounding relationship relative to the inner portion of the boom means 46. A first and second loading aperture 72 and 74 respectively are formed on the upper and lower walls 76 and 78 respectively. The lower wall 78 may form the inclined loading plate having the loading gate 11 formed therein to selectively open or close second loading aperture 74.

Figure 2:
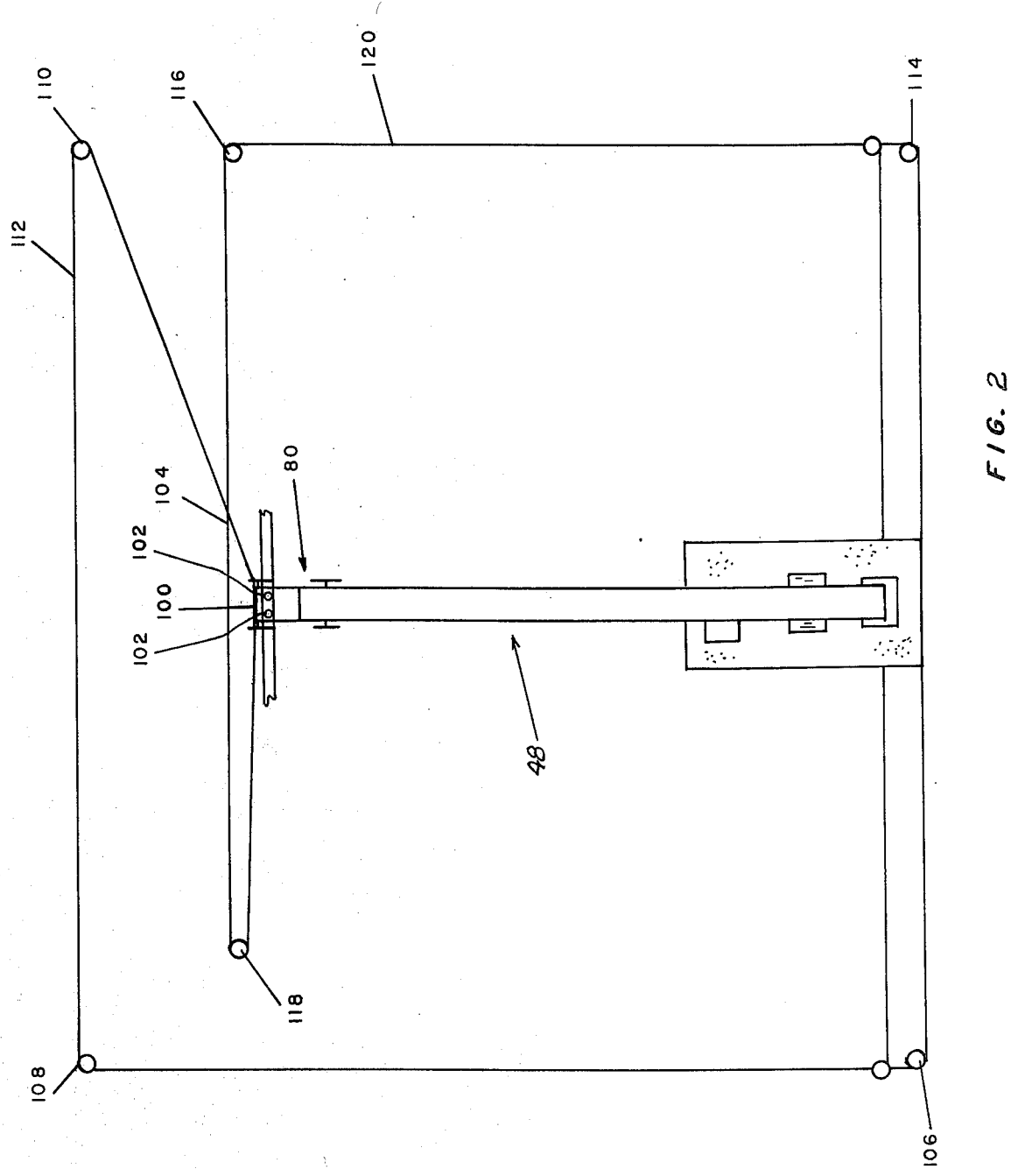
FIG. 2 is a top view of the backstacking apparatus.

As shown in FIGS. 1 and 2 the second boom member 48 may include a boom extension generally indicated as 80. The boom extension 80 comprises rake means extension 82 including a pair of endless chain means 84 and 86 operatively mounted on rake drive extension means including two pair of chain sprockets 88 and 90. Chain sprockets 88 are mounted on shaft 92 to rotate with chain sprockets 62. The boom extension 80 is adjusted vertically by cable 94 and pulley 95. Cable 94 is coupled between second power cable reel 96 and the boom extension 80 itself. The pulley 95 is attached to carriage 100 as described hereinafter. The boom extension 80 further includes a boom extension support and a boom extension positioning means. The boom extension support comprises a carriage 100 including rollers 102 coupled to the boom extension 80 for lateral movement along a pair of substantially parallel rails 104. The boom extension positioning means comprises a first positioning element including pulleys 106, 108, 110 together with a first flexible interconnecting member cable 112 and a second positioning element including pulleys 114, 116 and 118 together with a second flexible interconnecting member or cable 120. Opposite ends of cables 112 and 120 are coupled between the movable positioning means 2 and the carriage 100 to move the boom extension 80 laterally along rails 104 in response to lateral movement of the movable positioning means 2.

In operation, the particulate material is fed to the feed hopper 18 by some transportation means such as an endless conveyor belt where it is distributed to the storage or stacking area A when the control gate 20 is in the first position and to the loading zone B when the control gate 20 is in the second position. While in the second position the particulate material is permitted to fall directly through and onto the lower portion of the continuous endless conveyor belt or other proper transport means for removal to a remote site.

When storing or stacking, particulate material is fed from the feed hopper 18 to the storage zone A where the rake means 52 is driven in the forward or stacking direction engages the upper surface of the particulate material to draw the material outwardly relative to the base 6. As the material builds up relative to the supporting surface the base 6 is moved horizontally on the rails 14 to build up the pile evenly parallel to the rails 14. As the pile builds upwardly from the supporting surface, the boom means 46 is adjusted upwardly by the boom hoist means 8 to permit the pile to build upwardly.

To withdraw or reclaim, the loading gate 11 is placed in the second position with the rake means 52 driven in the second or reclaiming direction. As previously described, horizontal and vertical position of the boom means 46 is adjusted to keep the rake means 52 in contact with the upper surface of the stacked particulate material. As the particulate material is drawn inwardly to the base 6, the particulate material is drawn onto the platform 10 and loading zone B by the rake means 52 where it is fed through the loading gate 11 when incorporated in the structure to a conveyor or other suitable transport means for conveyance to a remote site.

Of course, the first boom member 48 may include an articulated extension to permit stocking at either horizontal angle or at a decreased angle. This articulated extension may incorporate a separate rake and rake drive means to permit independent a stacking operation.

With reference to the operation of the apparatus 1 disclosed in FIGS. 1 and 2, the control gate 20 is placed in the first or closed position to feed particulate material from the hopper 18 through feed aperture 66 and feed chute 68 into the loading zone A. With the control gate 20 and loading gate 11 both in the second position, particulate material is fed directly from the hopper 18 to the loading zone B. To reclaim particulate material from the storage zone A, the loading gate 11 is placed in the second position. As can be seen, particulate material may be stored with the control gate 20 in the second position and the loading gate 11 in the first position to reduce pollution by feeding through the unitized dust cover 70.

Since this structure obviates the use of conveyor dropping during stacking, the dust pollution is reduced to minimum. In addition, this method of stacking avoids any dead space thus increasing the stacking volume to storage space ratio.

In this manner, an efficient, reliable backstacking apparatus is provided.

It is thus apparent that this combination of elements provides an effective and efficient backstacking apparatus.

It will thus be seen that the objects set forth above, among those made apparent from the preceding description are, efficiently attained, and since certain changes may be made in the above construction without departing from the scope of the invention, it is intended that all matter contained in the above description or shown in the accompanying drawings shall be interpreted as ilustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what is claimed is:

1. A backstacking apparatus for stacking and reclaiming bulk particulate material comprising a particulate handling means operatively supported above a supporting surface by a movable positioning means, said particulate handling means comprising boom means including a first boom member configured to operatively support a rake means and rake drive means, said rake drive means coupled to said rake means to selectively move said rake means in a first or second direction relative to said first boom member, said movable positioning means comprising a base supported on the supporting surface by roller means and a boom hoist means operatively mounted on said base means, said base means further including feed hopper means to supply particulate material to said backstacking apparatus, said boom hoist means coupled to said boom means to selectively control said first boom member vertically relative to the supporting surface such that said rake means when operatively driven in the first direction moves particulate material outwardly from said base for stacking in a stacking zone and when said rake means is driven in said second direction the particulate material is drawn inwardly to said base to move said particulate materials from the stacking zone to a loading zone, said backstacking apparatus further including a dust enclosure disposed about the inner portion of said boom means and wherein said feed hopper includes a control gate having a first and second position, said dust enclosure comprising an upper and lower wall, said upper and lower walls including a first and second loading aperture respectively, said lower wall further including a loading gate having first and second positions to selectively open or close said second loading aperture such that particulate material is fed through said hopper to the stacking zone when said control gate is in said second position and said loading gate is in said first position, and particulate material is fed through said hopper to the loading zone when said control gate and said loading gate are both in said second position, particulate material being fed from the stacking zone to the loading zone when said loading gate is in said second position.

2. The backstacking apparatus of claim 1 wherein said feed hopper includes control means having a first and second position, said control means directing the particulate material to said storage zone when in said first position and to said loading zone when in said second position, said boom means including a second boom member, said second boom member fixedly attached to said base, said first boom member extending outwardly relative to said second boom member, said first boom member being pivotally mounted on said base, said rake means comprising a pair of substantially parallel spaced apart endless chain means including at least one blade element disposed between said pair of endless chain means, said rake drive means comprising at least two pairs of sprocket means rotatably mounted on said first boom member, said endless chain means engaging said sprocket pairs to drive said endless chains, said rake drive means further including at least one pair of idle sprockets pivotally mounted on said boom means to operatively engage said pair of endless chain means, said base means comprising a platform including a substantially horizontal element having loading gate formed therein and a first and second inclined element extending outwardly therefrom to said stacking zone such that particulate material may be reclaimed onto said inclined elements when said rake means moves in said second direction, said boom hoist means including a first boom hoist member attached to said base, a hoist drive means mounted on said base and a cable means interconnected between said hoist drive means and said boom means to control the vertical position of said boom means relative to the supporting surface, said boom means including a second boom hoist member attached between said base and said first boom hoist member.

3. The backstacking apparatus of claim 1 wherein said first boom member further includes a boom extension attached to the outer portion thereof, said boom extension including a boom extension support to support said boom extension on said first boom member, said boom extension support comprises a carriage having a plurality of rollers to permit lateral movement of said boom extension, said boom extension including rake means extension coupled to said rake drive means such that said rake means extension cooperatively operates with said rake means when driven by said rake drive means.

4. The backstacking apparatus of claim 3 wherein said boom extension further includes a boom extension positioning means including a first and second positioning element, said first and second elements each coupled between said carriage and said movable positioning means to move said boom extension laterally in response to movement of said movable positioning means.

* * * * *